Figure 1:
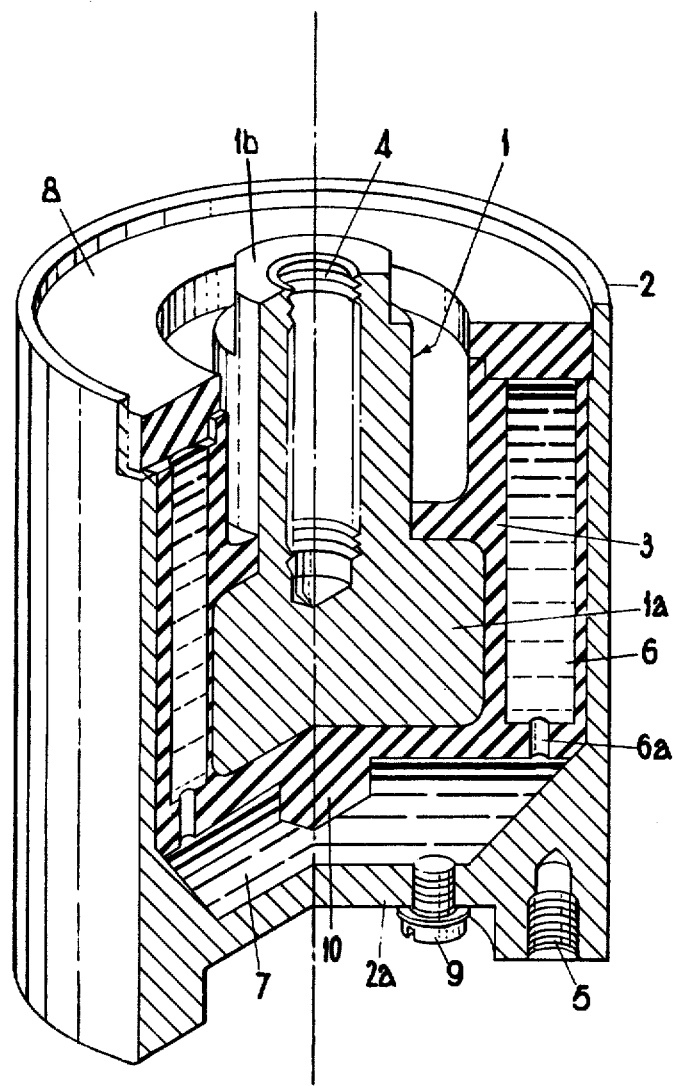

United States Patent
Jablonski et al.

[11] 3,888,449
[45] June 10, 1975

[54] ANTI-VIBRATION MOUNTINGS

[75] Inventors: Jan Jablonski, North Halling; Colwyn Francis Stone, Chatham, both of England

[73] Assignee: Elliot Brothers (London) Limited, Chelsmford, England

[22] Filed: Jan. 14, 1974

[21] Appl. No.: 433,250

[30] Foreign Application Priority Data
Jan. 16, 1973 United Kingdom............. 2314/73

[52] U.S. Cl............................. 248/358 R; 188/322
[51] Int. Cl............................................. F16m 13/00
[58] Field of Search ....... 248/15, 18, 20, 22, 358 R; 267/35, 113; 188/298, 322

[56] References Cited
UNITED STATES PATENTS

| | | | |
|---|---|---|---|
| 2,457,749 | 12/1948 | Thiry | 248/358 R |
| 2,535,080 | 12/1950 | Lee | 248/358 R |
| 3,658,314 | 4/1972 | Luzsicza | 267/35 |

*Primary Examiner*—William H. Schultz
*Attorney, Agent, or Firm*—Kirschstein, Kirschstein, Ottinger & Frank

[57] ABSTRACT

An anti-vibration mounting structure for isolating equipment from the vibration of a structure on which the equipment is mounted comprises a first member adapted to be secured to one of the equipment or the structure, a second member surrounding the first member and adapted to be secured to the other of the equipment or the structure, an element of resilient material secured to the first member and to the second member and a plurality of fluid filled chambers, each chamber having a wall area formed at least partially from said resilient material member and being arranged so that fluid transfer between the chambers due to distortion of the resilient material member provides damping of relative movement between the first and second members.

3 Claims, 2 Drawing Figures

ANTI-VIBRATION MOUNTINGS

This invention relates to anti-vibration mountings.

Such mountings are used for isolating equipment from the vibration of the structure on which the equipment is mounted. It is an object of this invention to provide an anti-vibration mounting having high datum stability and effective damping.

According to the present invention, an anti-vibration mounting for isolating equipment from the vibration of a structure on which the equipment is mounted comprises a first member adapted to be secured to one of the equipment and the structure, a second member surrounding the first member and adapted to be secured to the other of the equipment and the structure, an element of resilient material secured to the first member and to the second member and a plurality of fluid filled chambers, each chamber having a wall area formed at least partially from said resilient material member and communicating via a bore with at least one other chamber so that fluid transfer between the chambers due to distortion of said resilient material member provides damping of relative movement between the first and second members.

According to a preferred arrangement, the first and second members are co-axial, one within the other, and the chambers consist of a number of cylindrical chambers arranged in annular configuration between the sides of the first and second members, and a further chamber positioned between the ends of the first and second members, each cylindrical chamber communicating with the further chamber via a respective bore.

Figure 2:
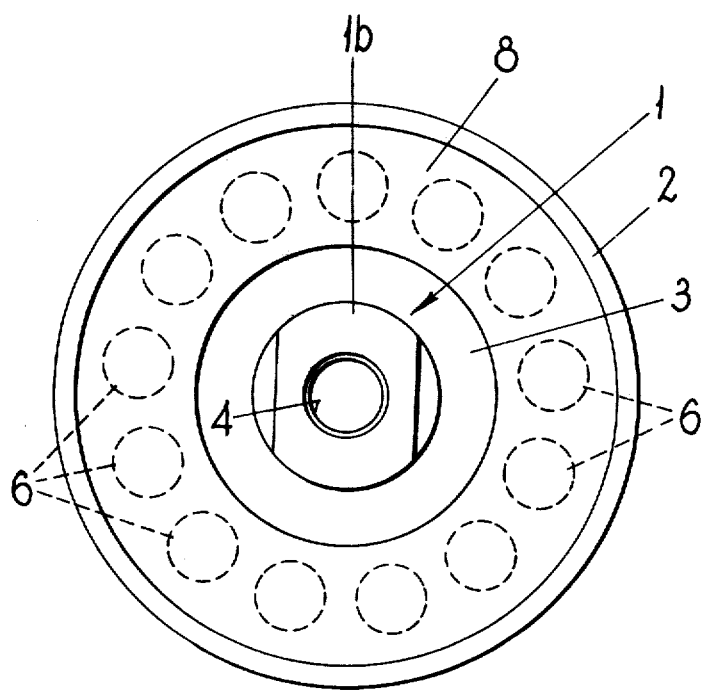

The invention will be more readily understood from the following description of a preferred embodiment of a mounting taking in conjunction with the accompanying drawings in which FIG. 1 shows a broken away perspective view of the mounting, and FIG. 2 shows a plan view of the mounting.

As shown in the drawing, the mounting consists of a central mushroom shaped metal boss 1 having a head 1a and a shank 1b surrounded by a co-axial cylindrical, metal sleeve 2, the space between the head 1a of the boss and the sleeve 2 containing a moulded element 3, of resilient material, for example silicone rubber, bonded to the head 1a and to the inner surface of the sleeve 2.

The shank of the boss 1 has a threaded bore 4 for mounting the equipment to be isolated and the sleeve 2 has a number of threaded bores 5 (only one of which is shown) for fixing the mounting to a structure.

The resilient element 3 is moulded so as to surround the head 1a of the boss 1 whilst being clear of most of the shank 1b and contains a number of cylindrical chambers 6 having their major axes parallel to the boss 1 and arranged in a circle around the boss 1.

Each chamber 6 is open at the top and has at its lower end a narrow bore 6a. The lower end of the sleeve 2 is closed by a base 2a to form a chamber 7 which is connected to the chambers 6 by the bores 6a. The tops of the chambers 6 are closed by a ring 8 which is retained in position by bonding and by turning over the top edge of the sleeve 2. A drain/filler plug 9 is provided in the base 2a. The resilient element 3 is formed with an overload stop member 10 on its lower surface. The chambers 6 and 7 are filled with damping fluid, for example a mixture of glycol and water.

The wall thickness of rubber around the chambers 6 is arranged to provide the required stiffness against deflection of the centre boss 1 axially and laterally. Movement of the boss 1 axially downwards causes the fluid in the chamber 7 to pass into the chambers 6 through the bores 6a at the lower end and vice versa. Movement of the boss 1 laterally causes fluid in those chambers 6 being compressed to pass via the chamber 7 to the enlarged chambers 6 on the opposite side. The central rubber stop member 10 in the chamber 7 makes contact with the plate 2a under downward overload forces and may be suitably shaped to provide the necessary overload spring characteristics.

The bonding of the resilient element 3 to the boss 1 and the sleeve 2 and the use of low loss silicon rubber achieves the desired datum stability. The degree of damping is determined by the dimensions of the chambers 6 and the bores 6a and the fluid viscosity. The fluid must not have any deleterious effect on the rubber and must remain fluid at a reasonable viscosity over the working temperature range.

Energy dissipated in the mounting will appear as heat in the fluid. The fluid is in direct contact with the metal base 2a and therefore the heat will be readily transferred via the sleeve to the structure to which the sleeve is fixed.

An ideal instrument mounting should have a resonant frequency of about 20Hz and should have a transmission of unity for frequencies up to the resonant frequency and complete cut-off above the resonant frequency. Also, the datum stability should be of the order of 0.001 inches for the entire life of the mounting.

The following table shows the values of these quantities obtained by a known mounting consisting of a rub- Comparison of Performance

| Axis of Loading Type Mounting | AXIAL Known | AXIAL Described | LATERAL Known | LATERAL Described |
|---|---|---|---|---|
| STATIC LOAD 9LB | | | | |
| Elastic Defln.inches | 0.022 | 0.029 | 0.015 | 0.025 |
| Datum Shift inches | 0.012 | 0.001 | 0.002 | 0.001 |
| Reduction in Datum Shift | 92% | | 50% | |
| | AXIAL Known | AXIAL Described | LATERAL Known | LATERAL Described |
| DYNAMIC LOAD 9LB | | | | |
| Input "±g" | 0.25 | 0.25 | =0.15 | 0.15 |
| Output "±g" | 1.05 | 0.44 | 0.83 | 0.25 |
| Resonant Freq.Hz. | 16.5 | 18 | 20 | 18 |
| Transmissibility output/input | 4.2 | 1.8 | 5.5 | 1.7 |
| Reduction in Transmissibility at Resonance | 57% | | 69% | | ber mounting with part friction damping and by the mounting as described herein.

We claim:

1. An anti-vibration mounting, for isolating equipment from vibration of a structure on which the equipment is mounted, comprising:
   A. a first member adapted to be secured to one of the equipment and the structure;
   B. a second member coaxially surrounding the first member and adapted to be secured to the other of the equipment and the structure;
   C. a member of resilient material secured to the first member and to the second member;
   D. a number of cylindrical fluid-filled chambers arranged in annular configuration between the sides of the first and second members and each having a wall area formed at least partially by said resilient material member; and
   E. a further fluid-filled chamber positioned between the ends of said first and second members and having a wall area formed at least partially by said resilient material member;
   F. each said cylindrical chamber communicating via a respective bore with said further chamber so that fluid transfer between the chambers due to distortion of said resilient material member provides damping of relative movement between the first and second members.

2. An anti-vibration mounting according to claim 1, in which the first member is in the form of a mushroom shaped boss and the second member is in the form of a cylindrical sleeve, the resilient material member being bonded to the head of the boss and the inner surface of the sleeve.

3. An anti-vibration mounting according to claim 1, in which the resilient material member is provided with an overload stop member to prevent overloading of the mounting in an axial direction.

* * * * *